United States Patent Office 3,435,587
Patented Apr. 1, 1969

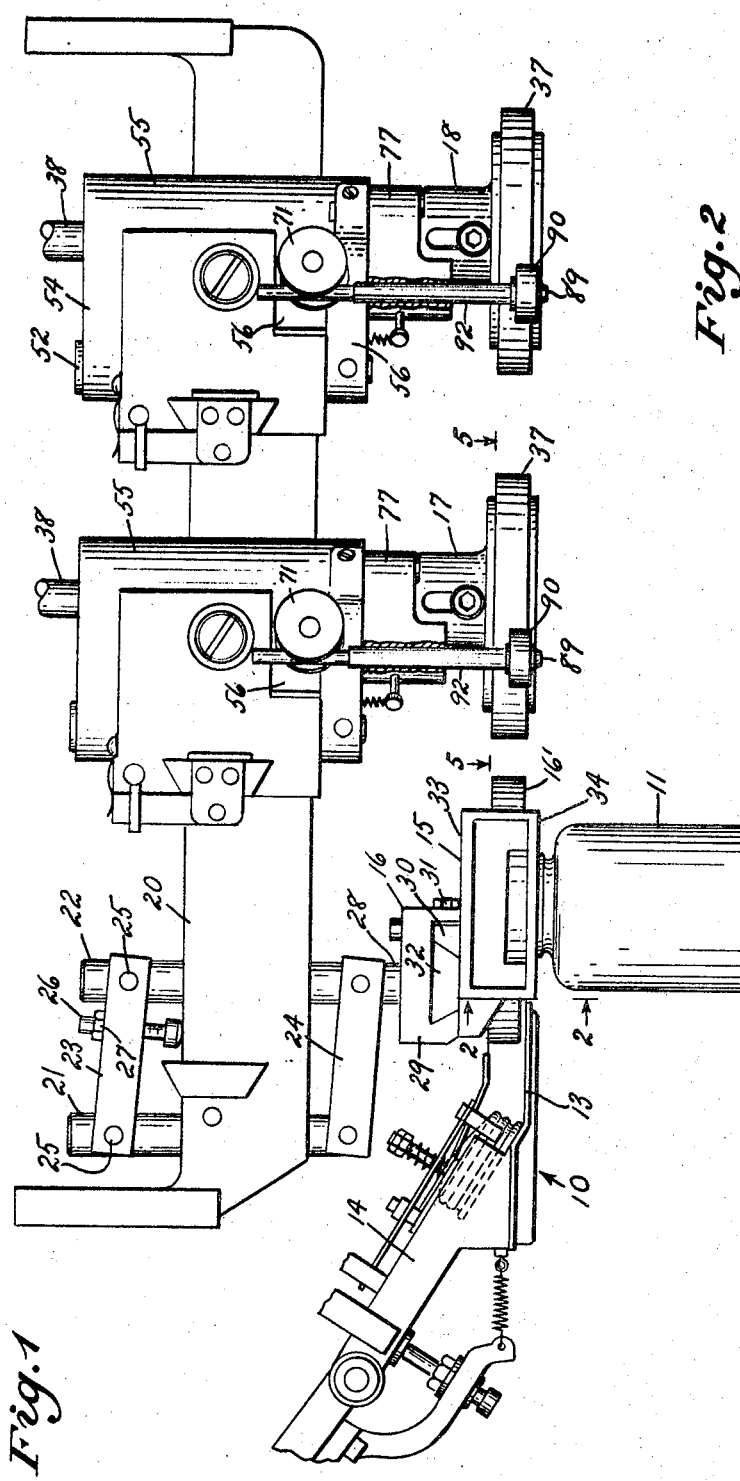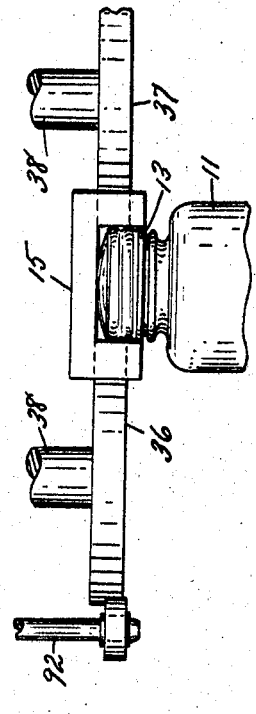

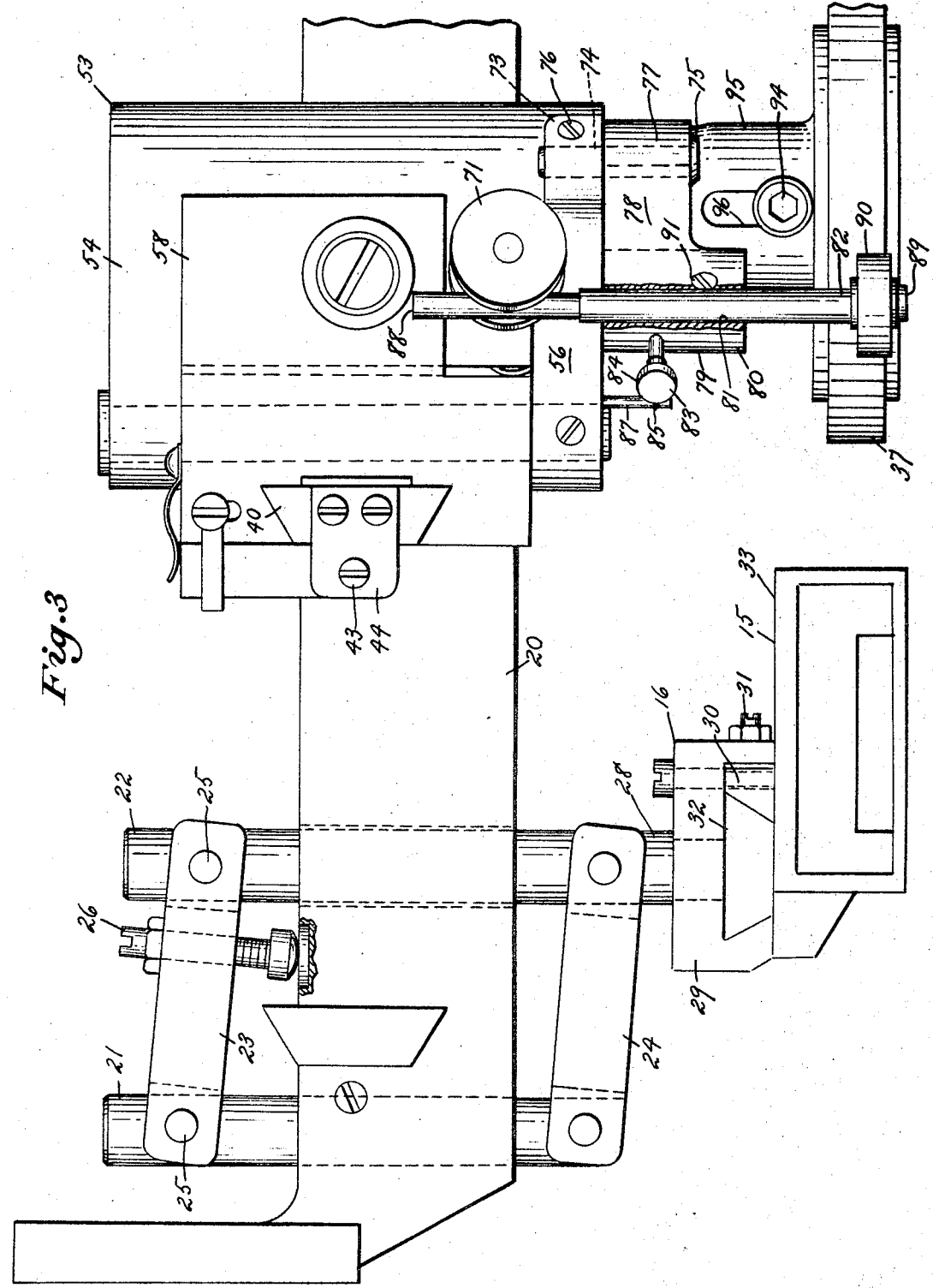

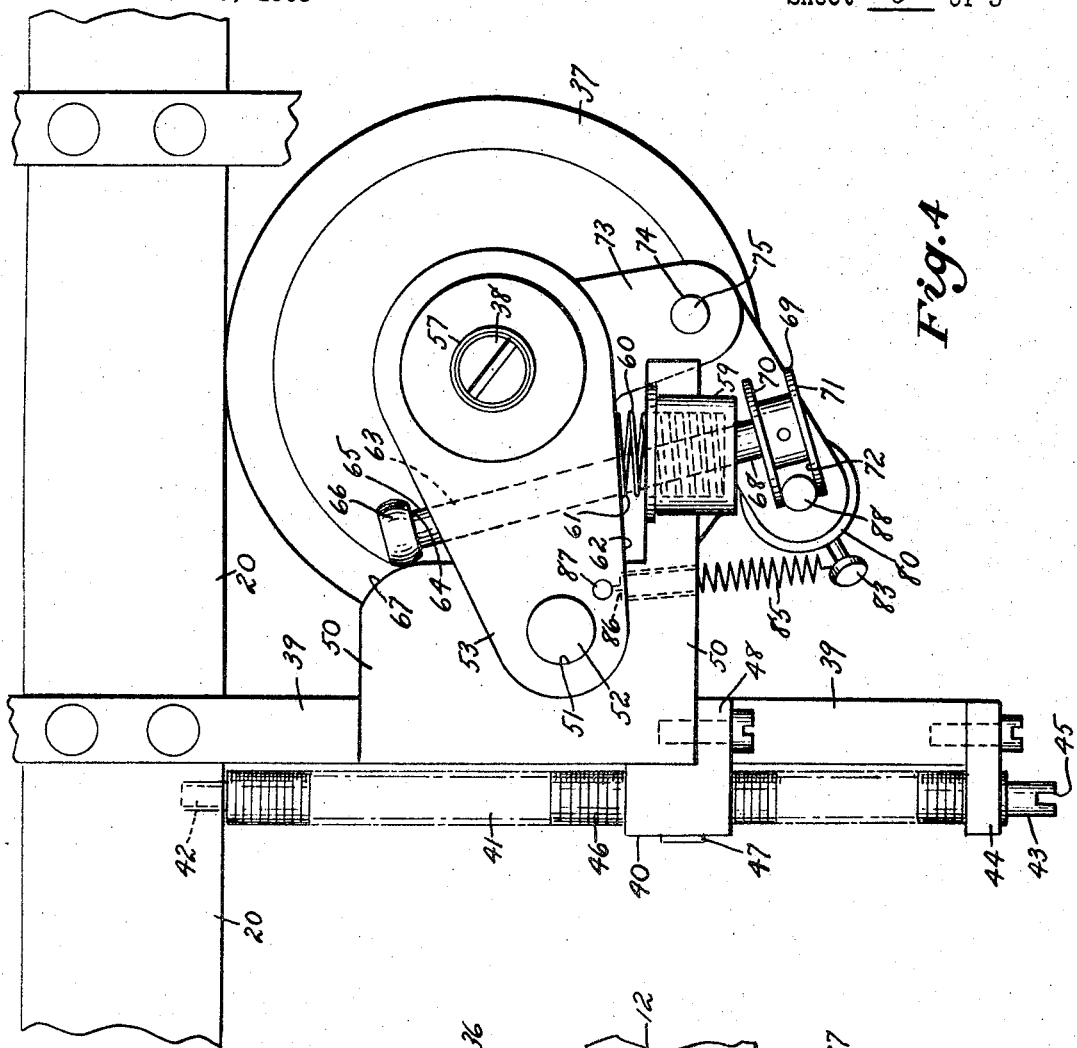
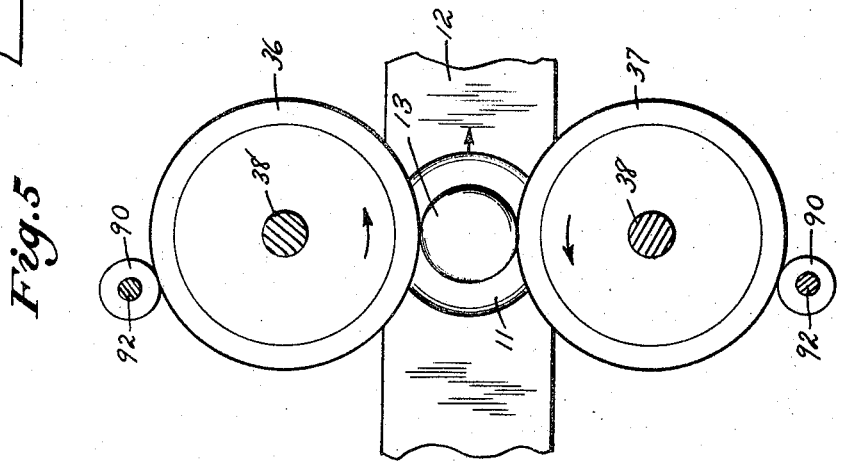

3,435,587
SELF-ADJUSTING CAP APPLYING MECHANISM
Arthur W. Weller, Brooklyn, N.Y., assignor to Resina Automatic Machinery Co., Inc., Brooklyn, N.Y., a corporation of New York
Filed Dec. 23, 1966, Ser. No. 604,285
Int. Cl. B67b 3/20; B65b 7/28
U.S. Cl. 53—317  3 Claims This invention relates generally to the field of container capping machines, and more particularly to an improved self-adjusting mechanism for determining the position of cap applying rollers in devices of the type exemplified by U.S. Patent No. 2,732,991, granted Jan. 31, 1956 to Emil N. de Bastos, and assigned to the same assignee as the instant application.

With machines of this type, wherein the containers and caps therefor travel at relatively high rates of speed, a large number of containers are capped over a relatively short period of time. During the capping operation, the caps pass between pairs of the above mentioned rollers which are usually provided with a resilient tread at the periphery thereof, in order to obtain proper purchase on the cylindrical surface of the caps to rotate the same into seated position. Improved purchase is obtained by using relatively low durometer rubber treads, and not surprisingly, treadwear is correspondingly greater, so that the necessity of stopping operation of the machine to manually adjust the lateral position of the axis of the rollers occurs with considerable frequency.

It is therefore among the principal objects of the present invention to provide structure by means of which adjustment of the lateral position of the rollers made necessary by peripheral treadwear may be accomplished auotomatically upon the occurrence of such wear, and without the necessity of interrupting operation of the capping machine.

Another object of the present invention herein lies in the provision of structure of the class described which may be incorporated into existing capping machines of the above described type with a minimum of modification.

Still another object of the invention lies in the provision of structure of the class described incorporating sensing means for determining the occurrence of wear at particular portions of the tread periphery, said sensing means being adjustable to sense a desired portion.

Yet another object of the invention lies in the provision of improved self-adjusting means for determining the position of cap positioning rollers, in which the means itself is of relatively simple construction and devoid of any easily damaged parts, whereby the accuracy of the self-adjusting means may be unimpaired with continued operation.

These objects, as well as other incidental ends and advantages, will become more clearly apparent during the course of the following disclosure, and be pointed out in the appended claims.

Briefly stated, the invention contemplates the provision of a first mounting means which is fixed relative to the capping machine, this means determining the location of the axis of rotation of a cap applying roller within a horizontal plane. Resilient means urges the second mentioned means in a direction which will position the moving periphery of the roller within the path of travel of successive caps, adjustable stop means determining the limit of travel of the second mentioned means under the influence of the resilient means. A sensing means contacting the periphery of the roller determines the degree of wear upon the same, and adjusts the limit of the path of travel in a lateral plane with respect to the axis of rotation to compensate for wear as the same is detected.

In the drawings, to which reference will be made in the specification, similar reference characters have been employed to designate corresponding parts throughout the several views.

FIGURE 1 is a fragmentary side elevational view of an embodiment of the invention showing the inventive construction in position upon a capping machine.

FIGURE 2 is a fragmentary vertical sectional view as seen from the plane 2—2 in FIGURE 1.

FIGURE 3 is a fragmentary enlarged side elevational view corresponding to the left hand portion of FIGURE 1.

FIGURE 4 is a fragmentary plan view as might be seen from the upper portion of FIGURE 3.

FIGURE 5 is a fragmentary horizontal sectional view as seen from the plane 5—5 in FIGURE 1.

In accordance with the invention, there is illustrated in FIGURE 1 a fragmentary view of a capping machine, generally indicated by reference character 10, which supports a series of containers 11 upon an endless belt 12 for the purpose of transporting the same from a cap receiving station 13 in the form of a gate at the lower end of a cap chute 14 to a leveling element 15. The element 15 is located at a first station 16 having a first set of cap applying rollers 16, and after passing through the first station, the containers move along the belt 12 to a second station 17 and third station 18 which completes the cap tightening operation.

The leveling element 15 is mounted upon a main horizontal supporting member 20 which forms a part of the capping machine 10, the member 20 in turn supporting a fixed upright member 21. A movable upright member 22 is interconnected with the fixed upright member 21 by means of link members 23 and 24, pintles 25 permitting the member 22 to move in a vertical direction, while preventing rotation about a horizontal axis. An adjustable stop 22 fixed in position by a locknut 27 determines the location of the lower end 28 of the member 22, the same being provided with a dovetail jaw 29 having a movable member 30 positioned by a screw 31 so as to engage a dovetail member 32 on the upper surface 33 of a leveling element 34, the operation of which is disclosed in the above mentioned Patent No. 2,732,991.

The second cap applying station 17 and third cap applying station 18 are substantially similar, as is the structure of the first station, which has been omitted from the drawing in FIGURE 1 for purposes of clarity, and, accordingly, a detailed description of one of said structures will suffice to describe all.

As is known in the art, there are located at each of the above stations first and second rollers 36 and 37, each driven by a flexible shaft 38 through a splined interconnection (not shown), so as to accommodate the diameter of a given series of caps being applied on containers.

Referring to FIGURE 4, each station includes a transversely arranged main support 39 interconnected with the member 20, and extending on either side thereof. Supported in turn by the supports 39 are transversely adjustable main brackets 40 which cooperate with lead screw means 41, each having an inner end 42 turning freely within a corresponding recess in the member 20, as well as an outer end 43 supported for rotation within a bracket 44. The outer end 43 may be provided with tool engaging means 45, or in the alternative a small crank (not shown), whereby the threaded outer surface 46 of the means 41 may cooperate with a split nut member 47 in well known manner, an extension 48 of which is secured by bolt means to the bracket 50.

The bracket 40 includes a main body portion 50 having a vertically arranged bore 51 therein. A pintle 52 penetrates the bore 51 and supports a pivotally mounted frame 53 including an upper horizontal member 54, a vertical member 55 and a lower horizontal member 56.

The vertical member 55 includes a vertical bore 57 having a bushing therein through which the shaft 38 passes. Disposed within a planar extension 58 of the portion 50 is a cup member 59 positioning a compression spring 60, the exposed end 61 of which bears upon a surface 62 of the frame 53 to urge the same in a counterclockwise direction as seen in FIGURE 4. The frame 53 also includes a horizontally disposed bore 63 supporting an elongated shaft 64 for axial movement therein. A first end 65 of the shaft 64 mounts a cam follower 66 which bears against a camming surface 67 on the portion 50 to thereby limit the path of travel of the frame 53, and thereby position the peripheral surface of the roller 37 supported thereby. The opposite end 68 thereof mounts a spool member 69 having first and second flanges 70 and 71 defining an annular groove 72 therebetween.

The bracket 53 includes a laterally extending member 73 (FIGURE 3) having a vertically positioned bore 74 engaged by a pintle 75 maintained therein by a set-screw 76. The pintle 75 also passes through a bore 77 in a pivotally mounted link 78, the free end 79 of which includes a downwardly extending portion 80 having a vertical bore 81 therein which provides a bearing for a vertically disposed shaft 82. A spring retaining pin 83 engages one end 84 of a contractile spring 85, the opposite end 86 thereof being engaged by a pin 87 on the portion 50.

The shaft 82 includes an upper end 88 positioned within the groove 72, and a lower end 89 supporting a metal roller bearing 90 in such position as to bear against the outer periphery of the roller 37. A height adjusting member 91 in the form of a set-screw bears against the shaft 82, whereby the height of the roller bearing 90 may be adjusted with respect to the height of the roller 37. This adjustment will in turn depend upon the adjustment of the roller 37 which is accomplished by loosening a bolt or screw 94 and moving a bracket 95 within the limits of travel permitted by a slot 96 to accommodate for the height of a container, as is well known in the art.

Prior to operation of the capping machine, the roller 37 is first positioned within the path of travel of the individual caps by fixing the position of the main bracket portion 40 with respect to the support 39. Normally, this adjustment will be fairly precise, so that caps passing between an adjacent pair of rollers 36–37 will be engaged and accommodated by a slight deflection in the tread of the roller, rather than deflection of the axis of rotation of the roller. This adjustment will determine the initial limit of travel of the frame 53, at which the frame will position itself under the influence of the spring 60. Operation may then be commenced, and will continue with the roller 90 contacting the peripheral surface of the roller 37 under the influence of the spring 85. As wear occurs, the reduction in the effective diameter of the roller 37 will permit the link 78 to move clockwise as seen in FIGURE 4, again under the action of the spring 85 so that the roller 90 may maintain contact therewith. This motion results in lateral displacement of the axis of the shaft 82, which motion is transmitted through the spool member 69 to result in axial displacement of the shaft 63 and a repositioning of the location of the cam follower 66 with respect to the frame 53. This movement, in turn, will determine a new limit of the path of travel of the frame 53, and under the influence of the spring 60 the frame will move to this new limit, thus moving the axis of rotation of the roller 37 toward the path of travel of the caps, whereby the initial adjustment is restored. Actually, the adjustment is a continuing process during operation, and by employing proper design parameters, it is possible to so construct the device that the adjustment will continue until substantially the entire tread of the cap applying rollers has been worn away.

It may thus be seen that I have invented novel and highly useful improvements in a self-adjustment means for use in conjunction with the cap applying rollers of a capping machine, whereby operation of the machine need be interrupted only to provide an initial adjustment for a given diameter cap size, or for replacement of the cap applying rollers themselves. Normal wear occurring with continued use is automatically and continuously compensated without the necessity of interrupting operation, thereby effecting a considerable saving in the amount of labor expended during servicing between such intervals.

I wish it to be understood that I do not consider the invention limited to the precise details of structure shown and set forth in this specification, for obvious modifications will occur to those skilled in the art to which the present invention pertains.

I claim:

1. In a container capping machine having means to feed a succession of caps and a succession of containers which meet at a capping location and roller means for rotating said caps to threadedly engage the same upon said containers, the improvement comprising means to automatically laterally adjust the axial position of said rollers to correspond to wear on the peripheral surfaces thereof, said means including first roller supporting means in fixed relation with respect to said capping machine, second means related to said first means for movement in a plane perpendicular to the axis of rotation of a roller, and having bearing means for supporting said roller for rotation, third means resiliently engaging said second means in a direction whereby said roller will lie within the path of travel of an engaged cap supported upon the neck of a container, fourth means for determining the limit of travel of said second means to fix the adjusted location of the peripheral surface of said roller, and sensing means for determining the effective diameter of said peripheral surfaces with the occurrence of wear, and relocating the position of said fourth means in accordance therewith.

2. Structure in accordance with claim 1, further characterized in that said second means is pivotally related to said first means.

3. Structure in accordance with claim 1 in which said sensing means includes a roller contacting the periphery of said cap applying roller, a shaft rotating about an axis parallel to that of said cap applying roller and supporting said last mentioned roller, a movable member responsive to lateral movement of said last mentioned shaft, and cam follower means on said movable member contacting a surface of said first means.

References Cited

UNITED STATES PATENTS

| 2,658,654 | 2/1949 | Schweizer | 53—318 |
| 3,018,597 | 1/1962 | Hohl | 53—317 X |

FOREIGN PATENTS

| 455,155 | 3/1949 | Canada. |

BERNARD STICKNEY, *Primary Examiner.*

ROBERT L. FARRIS, *Assistant Examiner.*

U.S. Cl. X.R.

53—331.5